(12) United States Patent
Shum et al.

(10) Patent No.: US 8,032,709 B2
(45) Date of Patent: Oct. 4, 2011

(54) SYSTEM, METHOD AND COMPUTER PROGRAM PRODUCT FOR HANDLING SHARED CACHE LINES IN A MULTI-PROCESSOR ENVIRONMENT

(75) Inventors: Chung-Lung Kevin Shum, Wappingers Falls, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/035,668

(22) Filed: Feb. 22, 2008

(65) Prior Publication Data

US 2009/0216951 A1    Aug. 27, 2009

(51) Int. Cl.
*G06F 12/00* (2006.01)
*G06F 13/00* (2006.01)
*G06F 13/28* (2006.01)

(52) U.S. Cl. ........ 711/124; 711/122; 711/150; 711/151; 711/152; 711/E12.093; 711/E12.094; 711/E12.098; 711/E12.091

(58) Field of Classification Search .............. None
See application file for complete search history.

(56) References Cited

U.S. PATENT DOCUMENTS

| | | | | |
|---|---|---|---|---|
| 5,361,368 A | * | 11/1994 | Herzl et al. ............ | 709/240 |
| 5,819,105 A | * | 10/1998 | Moriarty et al. ........ | 710/5 |
| 5,895,487 A | * | 4/1999 | Boyd et al. ............ | 711/122 |
| 5,897,657 A | * | 4/1999 | Hagersten et al. ...... | 711/145 |
| 6,625,701 B1 | | 9/2003 | Arimilli et al. | |
| 6,633,959 B2 | * | 10/2003 | Arimilli et al. ........ | 711/141 |
| 6,725,334 B2 | * | 4/2004 | Barroso et al. ........ | 711/122 |
| 6,738,871 B2 | * | 5/2004 | Van Huben et al. ..... | 711/150 |
| 6,738,872 B2 | * | 5/2004 | Van Huben et al. ..... | 711/150 |
| 6,865,645 B1 | * | 3/2005 | Shum et al. ........... | 711/123 |
| 6,963,953 B2 | * | 11/2005 | Nakajima ............. | 711/129 |

OTHER PUBLICATIONS z/Architecture, Principles of Operation, Sixth Edition, Apr. 2007, Publication No. SA22-7832-05, copyright IBM Corp. 1990-2007, pp. 1-1218.

* cited by examiner

*Primary Examiner* — Pierre-Michel Bataille
*Assistant Examiner* — Matthew Chrzanowski
(74) *Attorney, Agent, or Firm* — Cantor Colburn LLP; John Campbell

(57) ABSTRACT

A system, method, and computer program product for handling shared cache lines to allow forward progress among processors in a multi-processor environment is provided. A counter and a threshold are provided a processor of the multi-processor environment, such that the counter is incremented for every exclusive cross interrogate (XI) reject that is followed by an instruction completion, and reset on an exclusive XI acknowledgement. If the XI reject counter reaches a preset threshold value, the processor's pipeline is drained by blocking instruction issue and prefetching attempts, creating a window for an exclusive XI from another processor to be honored, after which normal instruction processing is resumed. Configuring the preset threshold value as a programmable value allows for fine-tuning of system performance.

20 Claims, 3 Drawing Sheets

SYSTEM, METHOD AND COMPUTER PROGRAM PRODUCT FOR HANDLING SHARED CACHE LINES IN A MULTI-PROCESSOR ENVIRONMENT

BACKGROUND OF THE INVENTION

This invention relates generally to multi-processor environments, and more particularly to handling shared cache lines to allow forward progress among processors in a multi-processor environment.

In a multiprocessing system where a consistent memory usage model is required, memory usage among different processors is managed using cache coherency ownership schemes. The schemes usually involve various ownership states for a cache line. The states include read-only (commonly known as shared) and exclusive (where a certain processor has the sole and explicit update rights to the cache line, sometimes known as store access).

For one such protocol used for a strongly-ordered memory consistency model, as in IBM's z/Architecture implemented by IBM System z processors, when a processor is requesting rights to update a line, e.g., when it is executing a "Store" instruction, the processor checks local cache (L1) for the line's ownership state. If the processor discovers that the line is either currently shared or is not in its cache at all, the processor sends an "exclusive ownership request" to a storage controller (SC) which serves as a central coherency manager.

The SC tracks which processor, if any, currently owns the line exclusively. If deemed necessary, the SC will then send a specific "cross interrogate" (XI) or "ownership change" request to another processor which currently owns that line to release its exclusive rights. The XI is usually called an "exclusive XI". Once the processor that currently owns the line has responded to the XI and responded that the exclusive ownership is released, the requesting processor is then given exclusive update rights to the line requested.

It is also possible that the SC may find that one or more processors currently have the requested line in read-only (or shared) state. The SC informs the requesting processors through the XI interface indicating that the line is about to be changed. The requesting processors' L1 logic ensures that data which currently exists in their caches is no longer consumed.

In a large SMP (Symmetric Multi-Processing) system, it is common that various processes running on different processors, or different threads within a processor, update or use the same cache lines, at similar times. When a process running on one processor references or updates a line that is currently owned exclusively by another processor, the owning processor must acknowledge the exclusive XI and relinquish exclusive ownership before the first processor can access that line.

In some implementations a processor may reject an exclusive XI request and retain exclusive access to that line, in which case the SC reprioritizes its pending requesters and resends the exclusive XI at a later time. In this case, it is important that the owning processor cannot retain exclusive access to that line indefinitely, such that the other processors cannot be given rights to update or use the line and end up not making forward progress, a condition known as a "live-lock." The live-lock situation can result from a variety of situations in the owning processor, including a long stream of updates to the line or a prefetch mechanism, which continually anticipates a need for exclusive access to the line.

In some prior processor designs, a processor is prevented from creating such a live-lock situation by requiring that it give up exclusive rights to a line as soon as possible after rejecting an exclusive XI, delaying this only until any pending updates are communicated to the memory controller (including any local caches).

In particular, live-lock is avoided by having an internal mechanism in the processor's cache control logic, which actively invalidates the line that had been the subject of a rejected XI as soon as possible. The mechanism may work as follows: when an exclusive XI is rejected, the address of the XI is saved in a register ("XI-save"); at the same time a record is made of all pending instructions within the processor. Any new instructions from this point on that request exclusive access to the same line as in the XI-save register is rejected. Once all instructions which were pending at the time of the XI reject have been completed, the processor invalidates the cache line corresponding to the address in the XI-save register. Following the invalidation, the XI-save register is reset and no longer inhibits access to the line by subsequent instructions; the next such access will miss the cache (since the line has been invalidated) and cause a new request to be sent to the SC. By actively invalidating the line, the owning processor guarantees that the repeated XI invalidate from the SC will be honored (not rejected). Even though this processor might be re-requesting the same line after the XI-save invalidation, the priority inside the SC ensures that the processor which had requested the line earlier gets access to the line first.

This traditional design allows forward progress in all processors, but may not yield optimal performance. In particular, if a program on a processor currently owning exclusive rights to a line is in the midst of a (short but not seemingly endless) sequence of updates to that line when it receives the invalidation request, it will immediately need to re-acquire exclusive ownership of that line. Because of latency involved in transferring ownership among processors, this results in all of the processors involved in the contention spending extra time waiting. In addition, the resulting traffic on the multiprocessor coherence fabric can impact other processors in the SMP system.

This mechanism also has the drawback of requiring complex control sequencing, with significant inter-dependencies between the processor, its local cache and SC designs to insure correct operation in all cases. Thus a simpler and more flexible design that can avoid a live-lock is desired.

BRIEF SUMMARY OF THE INVENTION

An exemplary embodiment includes a processor in a multi-processor environment having a storage controller (SC) and multiple processing units having cache memory involving various ownership states as to a cache line, which states include a read-only or shared state and an exclusive state for holding the cache line exclusively, for ensuring forward progress in shared cache line usages. The processor includes a cross interrogate (XI)-reject counter and a mechanism for performing a method. The method includes setting a XI-rejected state when an exclusive XI is rejected by the processor, and resetting the XI-rejected state when the exclusive XI is acknowledged. The method also includes incrementing the XI-reject counter when an instruction is completed while the XI-rejected state is active, and resetting the XI-rejected state afterwards. The method further includes setting a XI-threshold-stall state if the XI-reject counter hit a preset threshold value, resetting the XI-threshold-stall state and XI-reject counter if the exclusive XI is acknowledged, and blocking further instruction issue and prefetching attempts to obtain and hold the cache line exclusive when the XI-threshold-stall state is active.

Another exemplary embodiment includes a method for operating a computer system having a SC and multiple processing units having cache memory involving various ownership states as to a cache line, which states include a read-only or shared state and an exclusive state for holding the line exclusively, for ensuring forward progress in shared cache line usages. The method includes setting a XI-rejected state when an exclusive XI is rejected by a processing unit of the multiple processing units, and resetting the XI-rejected state when the exclusive XI is acknowledged. The method also includes incrementing a XI-reject counter when an instruction is completed while the XI-rejected state is active, and resetting the XI-rejected state afterwards. The method further includes setting a XI-threshold-stall state if the XI-reject counter hit a preset threshold value, resetting the XI-threshold-stall state and XI-reject counter if the exclusive XI is acknowledged, and blocking further instruction issue and prefetching attempts to obtain and hold the cache line exclusive when the XI-threshold-stall state is active.

A further exemplary embodiment includes a computer program product for handling shared cache lines to allow forward progress among processors in a multi-processor environment. The computer program product includes a computer-readable storage medium for storing instructions for executing shared cache line handling on a processor of the multi-processor environment as a method. The method includes adjusting a preset threshold value to alter when a XI-reject counter sets a XI-threshold-stall state to block further instruction issue and prefetching attempts to obtain and hold a cache line in response to hitting the preset threshold value, where the XI-reject counter counts in response to the processor rejecting an exclusive XI.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
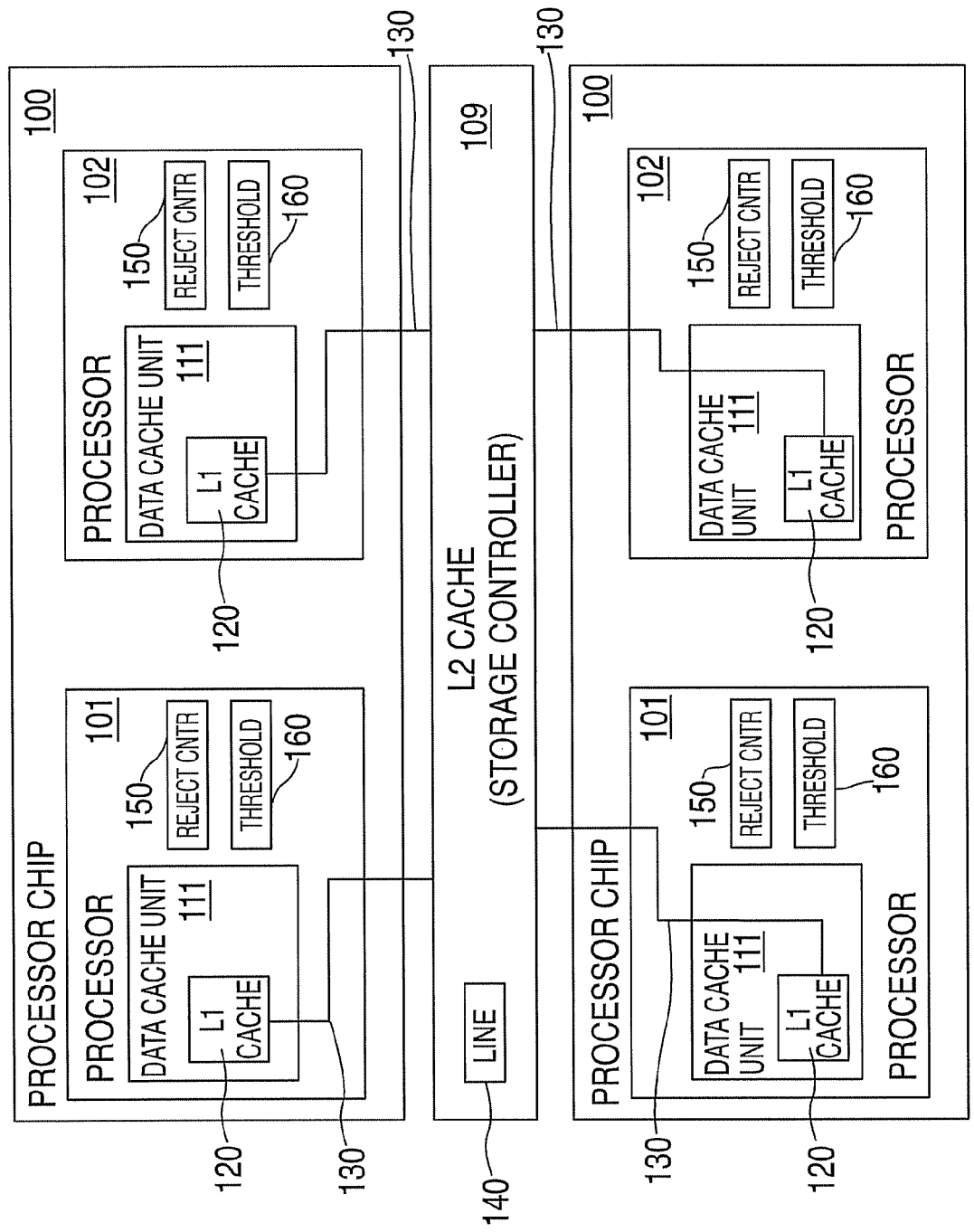
FIG. 1 is a block diagram of a multi-processor (MP) environment that may be implemented by an exemplary embodiment of the present invention.

An exemplary embodiment of the present invention handles shared cache lines to allow forward progress among processors in a multi-processor environment. When a requesting processor in the multi-processor environment desires exclusive access to a shared cache line that is assigned exclusively to an owning processor, the requesting processor initiates an ownership change request via a storage controller (SC). The SC issues a cross interrogate (XI) to the owning processor to relinquish ownership. The owning processor may reject the XI and retain control of the line. In an exemplary embodiment, a counter in the owning processor is incremented in response to completing the first instruction following the XI reject. When the counter reaches a programmable threshold, the owning processor enters a special mode of operation in which it is not allowed to reject XIs. This prevents the owning processor from rejecting XIs for the line indefinitely and guarantees that other processors in the multi-processor configuration can access the line within a predetermined time.

During this special mode of operation, the owning processor may stall its instruction processing and any exclusive line prefetching, allowing prior (pending) instructions to be drained out of its pipeline and preventing any new attempts to reserve exclusive access to cache lines. This eliminates conditions that may cause an XI to be rejected, thus allowing the requesting processor to access the line (or lines) for which prior XIs had been rejected by incrementing the counter and invoking the special mode of operation. The processor exits the special mode of operation and resumes normal instruction processing once an XI request is acknowledged. In the case where the SC design does not guarantee a repeat of a rejected XI, the processor includes a timeout mechanism to reset the special mode, and return to normal mode, if an exclusive XI is not received within a predefined period of time.

Since a processor cannot in general predict what a program is going to do, even in the near future, the processor cannot accurately determine whether it is better to relinquish a line immediately or wait sometime longer. In an exemplary embodiment, a programmable threshold register controls how long the owning processor is allowed to reject XIs before being forced to relinquish a line held with exclusive access. This allows the design to be tuned with respect to the multi-processor system's cache hierarchy, latency, and their target workload characteristics. Such tuning may be based on modeling of the design, on measurements of systems running relevant workloads, or performed dynamically by software or firmware in response to real-time performance measurements. An additional feature includes a means to tailor the owning processor's response based on whether exclusive ownership was obtained only conditionally (in response to a "fetch" type instruction) or in response to a "store" type operand reference. In particular, the owning processor may recognize when it should bypass the programmable counter to further improve performance, or utilize separate counters and thresholds for various specific situations.

Turning now to the drawings in greater detail, it will be seen that in FIG. 1 a multi-processor system is depicted. It will be understood that the system includes other components and design units known in the art that are not depicted in FIG. 1. The system includes two processor chips 100 and a storage controller (SC) 109, which also serves as level-2 (L2) cache. Each processor chip 100 includes two processors 101 and 102, which each further contain a data cache unit (DC) 111. Inside the DC 111 there is a level-1 (L1) data cache 120 for holding recently used cache lines.

Between the DC 111 and the SC 109, there are communication buses 130 for handling cache misses and XI requests. Although the system of FIG. 1 depicts a dedicated interface between the SC 109 and each DC 111, these interfaces may be shared among processors on processor chip 100. Upon a L1 data cache miss, the DC 111 sends a request through interface 130 to the L2 cache (which also serves as the SC) 109 indicating whether it needs a store access (exclusive) or a use access (read-only). The SC 109 returns requested data through interface 130 back to DC 111.

As an example, if a cache line 140 requested by processor 101 (requesting processor) is currently owned exclusively in processor 102 (owning processor), the SC 109 sends an exclusive XI to the DC 111 of processor 102. After the DC 111 of processor 102 receives the exclusive XI from SC 109, it acknowledges the XI request if there is no store processing is currently pending for line 140 in a pipeline (not depicted) of the processor 102. It also invalidates exclusive ownership in its directory. Otherwise, the DC 111 of the processor 102 sends a XI reject indication through interface 130 back to the SC 109. Upon receiving the XI reject indication, the SC 109 reprioritizes its pending requests, and eventually resends the exclusive XI request for line 140 back to DC 111 of processor 102.

As discussed above, it is possible that processor 102 is running a program that is consistently storing into line 140. A possible live-lock can be created if whenever the DC 111 receives the exclusive XI of line 140, the processor pipeline is also attempting to store or in the process of storing into line 140. This situation may result in a situation that processor 102 is running and completing instructions without any problem, but processor 101 is stuck waiting on the SC 109, which in turns waits on an exclusive XI acknowledgement from processor 102 by repeating the exclusive XI request for line 140.

Figure 2:
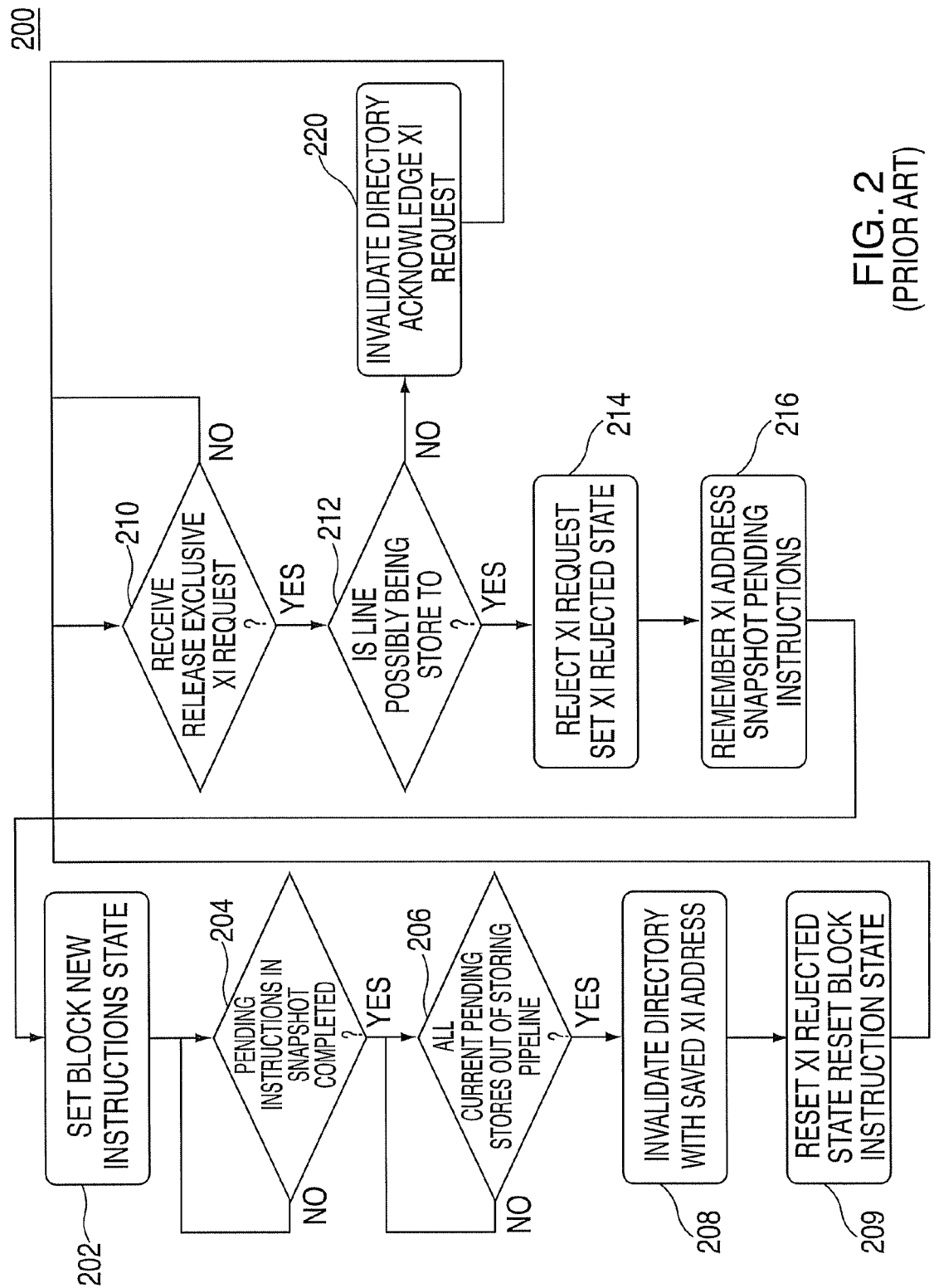
FIG. 2 illustrates a prior art process for recognizing a XI reject and actively invalidating cache lines to ensure progress in a MP environment.

Prior art to avoid live-lock is described in reference to process 200 of FIG. 2. At block 210, when an exclusive XI is received by a processor (e.g., an owning processor such as processor 102 of FIG. 1), a check is performed at block 212 if the requested line is currently being stored to, or anticipated to be stored to, then an XI reject indication is sent to an SC at block 214. If when an exclusive XI is processed, there is no store to the line in progress, the processor invalidates its directory to remove its exclusive ownership, and acknowledges to the SC that this has been done at block 220.

In the case that the processor rejects an XI, the processor saves the XI address into a XI-save register and arms its XI rejected state at block 216. At the same time, the processor records a "snapshot" of all pending instructions in the processor pipeline and sets a control state, which prevents newer instructions from entering into the pipeline at block 202. Only the instructions in the snapshot are then allowed to complete, and future instructions are either blocked or rejected. Once all instructions from the snapshot set are completed in block 204, the processor waits for all pending stores to be out of the storing pipeline at block 206. This is necessary because the storage update pipeline is longer than the processor execution pipeline. When all stores have been completed, the processor invalidates its directory with the address in the XI-save register at block 208. The processor then resets the "XI rejected" state, and also resets the control state that blocks new instructions at block 209. The processor then resumes normal instruction processing.

Figure 3:
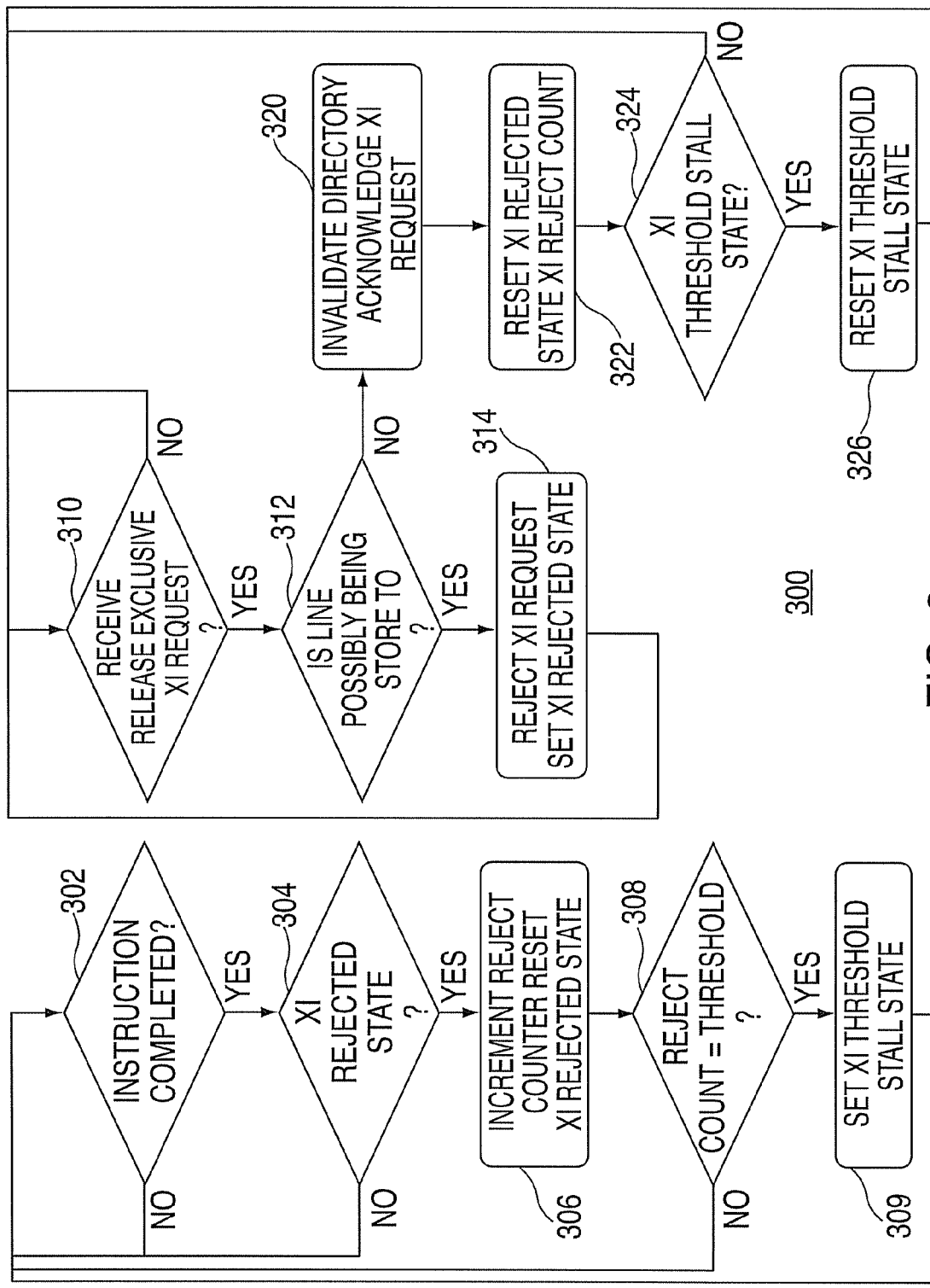
FIG. 3 depicts a process for utilizing a XI reject counter to stall instruction processing and ensure forward progress in a MP environment in accordance with an exemplary embodiment of the present invention.

Returning to FIG. 1, each processor 101 and 102 may include a reject counter 150 (also referred to as an XI reject counter 150) and a threshold 160 for managing XI request rejection when the respective processor is an owning processor. A process 300 for utilizing the XI reject counter 150 to stall instruction processing and ensure forward progress in accordance with an exemplary embodiment is depicted in FIG. 3, and described in reference to FIG. 1. At block 310, when processor 102 receives an exclusive XI, if the requested line (e.g., line 140) is currently being stored to, or anticipated to be stored to, at block 312, an XI reject indication is sent to the SC 109 at block 314. If when an exclusive XI is processed and no store to that line is in progress, the processor 102 updates its directory to remove its exclusive ownership, and acknowledges to the SC 109 that this has been done at block 320. This part is the processor 102's basic handling with its interface with the SC 109.

If an exclusive XI is rejected, a "XI rejected" control state is set at block 314. At block 302, whenever an instruction is completed, the "XI rejected" state is examined at block 304, and if set causes the XI reject counter 150 to be incremented, after which the "XI rejected" state is reset at block 306. A programmable threshold is provided as threshold 160 such that if the XI reject counter 150 equals the threshold 160 at block 308, then a special pipeline stall control state ("XI threshold stall") is set at block 309. This stall state blocks any new instructions from being issued, and also blocks any prefetching from being attempted. The effect of this "XI threshold stall" state is that the processor 102 cannot attempt to store to any lines nor to acquire and hold exclusive access to any lines not already held.

By blocking any new pipeline mechanism that might keep a line exclusive, this design ensures that the processor 102 honor an exclusive XI from the SC 109 (probably but not necessarily the one that was previously rejected). This is acknowledged by the processor 102 while the directory is being invalidated (320). This guarantees that once a processor reaches its preprogrammed XI reject threshold 160, another processor will have an opportunity to access the contended line and to make forward progress.

If at any point an exclusive XI is acknowledged, the XI rejected control state will be reset as well as the XI reject counter 150 at block 322. At block 324, if the "XI threshold stall" control state is set, it will also be reset at block 326.

A smaller threshold 160 allows a fast turnaround time to let other processor get the exclusivity on a line currently shared but is still being used in this processor. A bigger threshold 160 allows the owning processor to do more work before giving up the line 140 to avoid unnecessary cache line ping-pong, which involves delays in communicating among processors 101 and 102 and the SC 109. System performance can be fine-tuned to their workload, cache, and coherency scheme by evaluating or measuring the effects using different values for the threshold 160.

This invention can be extended for use in a system where the SC 109 is built with multiple parallel request pipelines, e.g., each pipeline handling requests for a different set of addresses. In this case, a separate set of XI rejected states and reject counters 150 is required for each SC request pipeline. The state and counters 150 are set or reset based only on their assigned pipe interactions. If any one of the XI reject counters 150 hits the threshold 160, their corresponding "XI threshold stall" states will be set. Each "XI threshold stall" state will only be reset after an exclusive XI for that corresponding pipe has gotten a positive acknowledgement.

This invention can also be extended in the case where the SC design does not guarantee a repeat of a rejected XI, possibly because there is a cancel interface where the requesting processor is canceling its original fetch request. In such case, the processor will include a timeout facility where if the "XI threshold stall" state is set but an exclusive XI is not received within a predefined period of time, it automatically resets such state and resumes normal processing.

This invention may also be extended to allow dynamic modification of the threshold 160 value(s) based on recognition of specific program behavior or paradigms. As an example, when a program is waiting in a spin loop for a lock or semaphore in memory to have a particular value, the threshold 160 may be lowered on the associated processor to minimize the impact of that spin loop on a processor which is modifying the lock or semaphore. Conversely, when a process holds a lock, the threshold 160 on the processor executing the process may be raised in order to maximize the probability that it can complete the work in the critical section of the program and release the lock without having to relinquish exclusive access to the line containing the lockword. The recognition of these and similar situations is dependent upon the instruction set architecture and on the programming idioms used. In an implementation of IBM z/Architecture, for example, critical sections of code most commonly begin with a COMPARE AND SWAP instruction, which yields an equal comparison, or a spin loop for a lock most commonly follows a COMPARE AND SWAP which yields an unequal comparison result.

In summary, a counter and a threshold (e.g., XI reject counter 150 and threshold 160 of FIG. 1) are provided in the hardware of a processing system such that the counter is incremented for every exclusive XI reject that is followed by an instruction completion, and reset on any exclusive XI acknowledgement. In an alternate exemplary embodiment, the cache line management is controlled in whole or in part using software and/or firmware. If the XI reject counter reaches a preset threshold value, the processor pipeline is drained by blocking instruction issue, creating a window for an exclusive XI from another processor to be honored, after which normal instruction processing is resumed. This approach can be implemented with minimal modifications to existing multi-processor systems, and the programmable threshold allows the fine-tuning of system performance.

Technical effects and benefits include using counters and programmable thresholds to handle shared cache lines and allow forward progress among processors in a multi-processor environment. It ensures forward progress on all processors by providing a much simpler and flexible design that uses programmable thresholds to control when exclusive ownership is to be given up when requested. This avoids live-lock problems and can be implemented via relatively simple control logic, while reducing the probability of design errors. The invention may also reduce verification effort needed to ensure correct operation of within a multi-processor system.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

IBM® is a registered trademark of International Business Machines Corporation, Armonk, N.Y., U.S.A. Other names used herein may be registered trademarks, trademarks or product names of International Business Machines Corporation or other companies.

The invention claimed is:

1. A processor in a multi-processor environment having a storage controller (SC) and multiple processing units having cache memory involving various ownership states as to a cache line, which states include a read-only or shared state and an exclusive state for holding the cache line exclusively, for ensuring forward progress in shared cache line usages, the processor comprising:
 a cross interrogate (XI)-reject counter; and
 a mechanism for performing a method comprising:
  setting a XI-rejected state when an exclusive XI is rejected by the processor;
  resetting the XI-rejected state when the exclusive XI is acknowledged;
  incrementing the XI-reject counter when an instruction is completed while the XI-rejected state is active, and resetting the XI-rejected state afterwards;
  setting a XI-threshold-stall state if the XI-reject counter hit a preset threshold value;
  resetting the XI-threshold-stall state and XI-reject counter if the exclusive XI is acknowledged; and
  blocking further instruction issue and prefetching attempts to obtain and hold the cache line exclusively when the XI-threshold-stall state is active.

2. The processor of claim 1 wherein in response to the blocking instruction issue and prefetching, after all store instructions in the processor drain out, a new exclusive XI request from the SC is acknowledged.

3. The processor of claim 2 wherein in response to acknowledging the new exclusive XI request, another processor gains access to the cache line to make forward progress.

4. The processor of claim 1 wherein the method further comprises:
 adjusting the preset threshold value as a function of system performance evaluations or measurements among various workloads.

5. The processor of claim 1 wherein the method further comprises:
 resetting the XI-threshold-stall state if a subsequent exclusive XI is not received within a predefined period of time.

6. The processor of claim 1 wherein the SC includes a plurality of pipelines, and the XI-rejected state and XI-reject counter are among a set of XI-rejected state and XI-reject counters for each independently running pipeline in the SC, wherein each XI-rejected state is set or reset via an exclusive XI reject or acknowledgement for its corresponding SC pipeline, and each XI-reject counter is incremented or reset via its corresponding active XI-rejected state and an instruction completion or an exclusive XI acknowledgement, and further wherein a set of XI-threshold stall states is provided with each state set by a corresponding XI-reject counter hitting the preset threshold value.

7. The processor of claim 1 wherein the method further comprises:
 providing access for software or firmware to adjust the preset threshold value;
 increasing the preset threshold value in response to recognizing a software construct indicating that the processor is holding a lock or semaphore;

decreasing the preset threshold value in response to recognizing a software construct indicating that the processor is waiting on a lock or semaphore; and restoring the preset threshold value to its original value after the software has passed the lock or semaphore construct.

8. A method for operating a computer system having a storage controller (SC) and multiple processing units having cache memory involving various ownership states as to a cache line, which states include a read-only or shared state and an exclusive state for holding the cache line exclusively, for ensuring forward progress in shared cache line usages, the method comprising:

setting a XI (cross interrogate)-rejected state when an exclusive XI is rejected by a processing unit of the multiple processing units;

resetting the XI-rejected state when the exclusive XI is acknowledged;

incrementing a XI-reject counter when an instruction is completed while the XI-rejected state is active, and resetting the XI-rejected state afterwards;

setting a XI-threshold-stall state if the XI-reject counter hit a preset threshold value;

resetting the XI-threshold-stall state and XI-reject counter if the exclusive XI is acknowledged; and blocking further instruction issue and prefetching attempts to obtain and hold the cache line exclusively when the XI-threshold-stall state is active.

9. The method of claim 8 wherein in response to the blocking instruction issue and prefetching, after all store instructions in the processing unit drain out, a new exclusive XI request from the SC is acknowledged.

10. The method of claim 9 in response to acknowledging the new exclusive XI request, another processing unit gains access to the cache line to make forward progress.

11. The method of claim 8 further comprising:

adjusting the preset threshold value as a function of system performance evaluations or measurements among various workloads.

12. The method of claim 8 further comprising:

resetting the XI-threshold-stall state if a subsequent exclusive XI is not received within a predefined period of time.

13. The method of claim 8 wherein the SC includes a plurality of pipelines, and the XI-rejected state and XI-reject counter are among a set of XI-rejected state and XI-reject counters for each independently running pipeline in the SC, wherein each XI-rejected state is set or reset via an exclusive XI reject or acknowledgement for its corresponding SC pipeline, and each XI-reject counter is incremented or reset via its corresponding active XI-rejected state and an instruction completion or an exclusive XI acknowledgement, and further wherein a set of XI-threshold stall states is provided with each state set by a corresponding XI-reject counter hitting the preset threshold value.

14. The method of claim 8 further comprising:

providing access for software or firmware to adjust the preset threshold value;

increasing the preset threshold value in response to recognizing a software construct indicating that the processor is holding a lock or semaphore;

decreasing the preset threshold value in response to recognizing a software construct indicating that the processor is waiting on a lock or semaphore; and restoring the preset threshold value to its original value after the software has passed the lock or semaphore construct.

15. A computer program product for handling shared cache lines to allow forward progress among processors in a multi-processor environment, the computer program product comprising:

a non-transitory computer-readable storage medium for storing instructions for executing shared cache line handling on a processor of the multi-processor environment comprising a method of:

setting a XI (cross interrogate)-rejected state when an exclusive XI is rejected by a processing unit of the multiple processing units;

resetting the XI-rejected state when the exclusive XI is acknowledged;

incrementing a XI-reject counter when an instruction is completed while the XI-rejected state is active, and resetting the XI-rejected state afterwards;

setting a XI-threshold-stall state if the XI-reject counter hit a preset threshold value;

resetting the XI-threshold-stall state and XI-reject counter if the exclusive XI is acknowledged;

blocking further instruction issue and prefetching attempts to obtain and hold the cache line exclusively when the XI-threshold-stall state is active; and adjusting the preset threshold value to alter.

16. The computer program product of claim 15 wherein in response to the blocking instruction issue and prefetching, after all store instructions in the processing unit drain out, a new exclusive XI request from a storage controller (SC) is acknowledged.

17. The computer program product of claim 16 in response to acknowledging the new exclusive XI request, another processor gains access to the cache line to make forward progress.

18. The computer program product of claim 15 wherein adjusting the preset threshold value is performed as a function of system performance evaluations or measurements among various workloads.

19. The computer program product of claim 15 further comprising:

increasing the preset threshold value in response to recognizing a software construct indicating that the processor is holding a lock or semaphore;

decreasing the preset threshold value in response to recognizing a software construct indicating that the processor is waiting on a lock or semaphore; and restoring the preset threshold value to its original value after the software has passed the lock or semaphore construct.

20. The computer program product of claim 15 wherein the XI-threshold-stall state is reset if a subsequent exclusive XI is not received within a predefined period of time.

* * * * *